United States Patent
Nelson, Jr. et al.

(10) Patent No.: US 7,308,285 B2
(45) Date of Patent: Dec. 11, 2007

(54) ANTENNA ADAPTATION IN A TIME DIVISION DUPLEXING SYSTEM

(75) Inventors: George Rodney Nelson, Jr., Merritt Island, FL (US); James A. Proctor, Jr., Melbourne Beach, FL (US); John A. Regnier, Palm Bay, FL (US)

(73) Assignee: InterDigital Technology Corporation, Wilmington, DE (US)

( * ) Notice: Subject to any disclaimer, the term of this patent is extended or adjusted under 35 U.S.C. 154(b) by 582 days.

(21) Appl. No.: 10/434,437

(22) Filed: May 7, 2003
(Under 37 CFR 1.47)

(65) Prior Publication Data
US 2004/0147287 A1 Jul. 29, 2004

Related U.S. Application Data

(60) Provisional application No. 60/466,535, filed on Apr. 29, 2003, provisional application No. 60/378,698, filed on May 7, 2002, provisional application No. 60/378,908, filed on May 7, 2002.

(51) Int. Cl.
*H04M 1/00* (2006.01)

(52) U.S. Cl. .............................. 455/562.1; 455/67.11; 455/269

(58) Field of Classification Search ............. 455/67.11, 455/73, 78, 83, 450, 452.1, 453, 561, 562.1, 455/269, 272
See application file for complete search history.

(56) References Cited

U.S. PATENT DOCUMENTS

| | | | |
|---|---|---|---|
| 5,303,240 A | 4/1994 | Borras et al. | |
| 5,463,403 A | 10/1995 | Walker et al. | |
| 5,617,102 A | 4/1997 | Prater | |
| 5,680,142 A | 10/1997 | Smith et al. | |
| 5,745,858 A | 4/1998 | Sato et al. | |
| 5,936,569 A | 8/1999 | Stahle et al. | |
| 5,991,329 A | 11/1999 | Lomp et al. | |
| 6,369,756 B1 | 4/2002 | Wang et al. | |
| 6,400,317 B2 | 6/2002 | Rouphael et al. | |
| 6,493,759 B1 * | 12/2002 | Passman et al. | 455/450 |
| 6,580,394 B2 | 6/2003 | Wang et al. | |
| 7,013,165 B2 * | 3/2006 | Yoon et al. | 455/561 |
| 7,047,046 B2 * | 5/2006 | Hoffmann et al. | 455/562.1 |
| 7,062,246 B2 * | 6/2006 | Owen | 455/562.1 |
| 2003/0050016 A1 | 3/2003 | Boros et al. | |
| 2003/0064739 A1 | 4/2003 | Lindskog et al. | |

* cited by examiner

*Primary Examiner*—Quochien B. Vuong
(74) *Attorney, Agent, or Firm*—Volpe and Koenig, P.C.

(57) ABSTRACT

A technique for steering a directional antenna such as may be used with User Equipment (UE) in a wireless communication system. Optimum angle settings for the directional antenna are determined as different values for an uplink and downlink; that is for simple reception and simple transmission. Thus, rather than determine compromised directions that are picked in an attempt to optimize transmission and reception with the same directional setting, directional settings may be optimized independently. The invention is of particular use in a Time Division Duplex (TDD) system where transmit and receive functions can be operating independently at different times. In further aspects, an optimum direction is determined by estimating an interference signal power which is detected from signals emanating from adjacent base stations (access points) and determining a directional setting that minimizes interference to adjacent cells based upon such measurements. A further level of sophistication in antenna angle setting, is to monitor the loading of adjacent cell sites base stations and turning interference and determine the settings accordingly to minimize interference to such heavily loaded neighbors. Further aspects of the invention adapts to acquisition modes that accommodate the directional setting in active use of the system.

18 Claims, 12 Drawing Sheets

ANTENNA ADAPTATION IN A TIME DIVISION DUPLEXING SYSTEM

RELATED APPLICATIONS

This application claims the benefit of U.S. Provisional Application No. 60/378,698, filed on May 7, 2002, U.S. Provisional Application No. 60/378,908, filed on May 7, 2002 and U.S. Provisional Application No. 60/466,535 filed on Apr. 29, 2003, entitled "Application of User Equipment Antenna to Time Division Duplex System", all of which are assigned to Tantivy Communications Corporation, the assignee of this application. The entire teachings of the above applications are incorporated herein by reference.

BACKGROUND OF THE INVENTION

Wireless data communication networks of various types, including digital cellular systems, Wireless Local Area Networks (WLANs) and even personal area networks such as Bluetooth are increasingly viewed as an ideal connectivity solution for many different applications. These can be used to provide access to wireless equipped personal computers within home networks, mobile access to laptop computers and personal digital assistants (PDAs), as well as for robust and convenient access in business applications.

Indeed, it is estimated at the present time that approximately 10% of all laptop computers are shipped from the factory with wireless interface cards. One estimate is that this ratio will increase to 30% within the next two years. Certain microprocessor manufacturers, such as Intel, have incorporated wireless capability directly into processor chip platforms. These and other initiatives will continue to drive the integration of wireless equipment into computers of all types.

It is actually already possible in some cities to find "hot spots" where one can obtain connectivity to many different networks at the same time. Unfortunately, having tens, if not hundreds, of closely spaced networks means that interference becomes a problem. That is, although the most emerging wireless standards provide for robust signaling in the form of spread spectrum radio frequency modulation, or using Code Division Multiple Access (CDMA) over modulated subcarriers, crowding of the radio spectrum still increases noise and therefore decreases performance for all users.

The capacity of CDMA networks which use a frequency reuse factor of one is limited by both intercell and intracell interference. Techniques such as Multi User Detection (MUD) can be used to mitigate intracell interference. Intelligent management of channel power, code words, and time slots (that is, robust Radio Resource Management (RRM)) can also be used.

Of most interest to the present invention, it is also possible to use a directional, or adaptive, antenna to determine the optimal direction in which to transmit and receive signals. The directional antenna focuses the radiated power of such signals, so as to minimize interference with other transmissions.

One technique that can be used to mitigate intercell interference is a directional antenna on the mobile (remote) or so-called User Equipment (UE). To understand the advantages of doing this, consider a situation where adjacent base stations or sectors cause intercell interference on the forward link channels transmitted from Central Base Station Transceivers (BTSs) to the UEs. If these downlink (DL) channels have angular separation between the signals of the desired base station or sector and those of the interfering base stations or sectors, then the directional antenna on the UE can provide some amount of suppression of the interference. The exact amount depends on the angular separation, front-to-back ratio of the antenna, and the beam width of the antenna.

Users in adjacent cells or sectors also cause intercell interference on the uplink (UL) or reverse direction. If the directional antenna can be pointed such that most of the transmitted energy is directed to the desired base station and away from the adjacent cells or sectors, then the antenna can provide intercell interference suppression on the uplink as well. This interference suppression will manifest itself as a reduction of interference at the desired base station receiver.

The use of a directional antenna therefore contributes directly to improvements in link budget. It provides additional antenna gain over a standard omni directional antenna when operated in a directional mode. Depending on the algorithm used for steering, the additional gain can contribute directly to both the uplink and downlink link budgets. The directional antenna also reduces the effects of fading due to local scattering. The directivity of the antenna allows only a portion of the path structure created by the local environment to reach the receiver input, reducing the amount of fading. The required fast fade margin is therefore also reduced.

However, in order for the directional antenna to be most effective, it must be steered in the proper direction for both uplink and downlink. In packet switched Frequency Division Duplex (FDD) systems, the directions for both downlink and uplink typically must be the same since both the UL and DL carrier frequencies are active at the same time. Often, a compromise direction is thus picked to optimize reception in both directions.

However a Time Division Duplex (TDD) system has certain advantages over FDD when it comes to antenna steering:

Because the UE is half duplex, DL and UL pointing directions can be different, allowing an optimum direction to be selected in each case.

Because the DL and UL typically operate on the same frequency, under most conditions, the DL and UL path losses will be the same.

The frame structure of TDD is such that there are non-active time slots available for checking alternate antenna directions and computing the antenna steering metrics.

SUMMARY OF THE INVENTION

The present invention relates to a technique for setting an optimum direction for an antenna in a wireless communications system. The system has an automatically steerable antenna which can be selected to a number of different angular settings. The antenna is first set to a candidate setting. A metric is then measured with that setting; the metric is associated with utilization of the antenna at the candidate setting, such as by determining the relative quality of the signal received in the candidate setting. Such metrics are then taken for at least two different candidate settings and a best result, or optimum setting result is determined. The process is then repeated using different metrics for an optimum setting for different communication channels in the system. Specifically, optimum settings are determined for a communication channel operating in an uplink direction using a metric that is different for a communication channel operating in a downlink direction. The invention therefore may result in different optimum settings being determined for the uplink and downlink channels.

In the preferred embodiment the candidate settings provided by the steerable antenna include at least an omnidirectional mode, a right directional mode, and a left directional mode; although antennas having a lesser or greater number of directional modes may be employed.

Metrics are typically measured during the reception of appropriate signals such as pilot channel signals, but may also be taken on other types of signals such as data payload signals.

The invention is particularly advantageous, in a Time Division Duplex (TDD) system, since metrics can be taken during inactive time slots. In addition, coordination for uplink and downlink communication channels is more readily determined, since in typical TDD systems, either the uplink or the downlink is active in any given time slot.

In additional aspects the invention applies the determined optimum antenna setting to select different gain adjustment factors. The gain adjustment factors, which are indicative of the path loss associated with the system operating in the particular determined directional mode, are then applied as correct algorithms that control a power level of transmitted signals. Thus, for example, typical closed loop power control algorithms that are used to set uplink and downlink power level settings are adjusted for the antenna gain associated with a particular optimum setting.

In further aspects, the optimum directional settings may be stored in a register, memory, or other storage device and read out in synchronism with known assigned active time slots. Thus, a system which requires the antenna to be steered to a particular direction in a given time slot may be readily steered to another optimum direction in the next adjacent time slot.

Other aspects of the invention are directed to optimizing an initial acquisition mode. During an initial detection mode, system parameters are determined with the antenna in an omnidirectional setting. However, an additional set of procedures is advantageously performed after initial detection, in order to determine the best pointing angle for subsequent transmissions. In this situation, measurements taken during the omnidirectional mode are adjusted to achieve the same sensitivity, in terms of maximum expected path loss, as if the original search were conducted in a directional mode. The sensitivity improvement factor is determined as gain difference between an omnidirectional and directional mode, as measured during the subsequent processing. This aspect of the invention allows for extra gain in a directional mode to be used to provide still increased coverage for the system.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF A PREFERRED EMBODIMENT

A description of one preferred embodiment of the invention follows. This particular embodiment is for a cellular wireless communication system that is known as Universal Mobile Telephone System (UMTS) Wideband Code Division Multiple Access (W-CDMA) as specified in the Telecommunications Industry Association (TIA) T1.3GPP.25 series of specifications; it should be understood that the principles of the invention may be applied to other types of wireless systems, however.

Basic Operation

In any cellular system there is generally a central Base Transceiver Station (BTS) or access point (AP), that communicates to remote units, or User Equipment (UE). Any such system is bi-directional in nature, that is, it must provide the ability to communicate from the BTS to the UE (downlink) and from the UE to the BTS (uplink). The duplexing of the uplink and downlink communication channels may be performed in two primary ways. These are Frequency Division Duplexing (FDD) and Time Division Duplexing (TDD). FDD separate carrier frequencies are utilized to facilitate the uplink and downlink communications. For Time Division Duplexing (TDD), the same frequency band is used for both the uplink and downlink. With TDD however, the uplink is active during certain time slots, while the downlink is active during others. The communication channels from user to user may be either time modulated in the separate time slots (TDMA) or may be Code Division Multiple Access (CDMA). Both TDD/CDMA and TDD/TDMA based access approaches are thus seen in use.

For TDD systems, the propagation channel is reciprocal meaning that the path loss and fading statistics of the channel will be the same in both the BTS to UE and UE to BTS transmission directions, since the same carrier code frequency is used in both directions.

Figure 1:
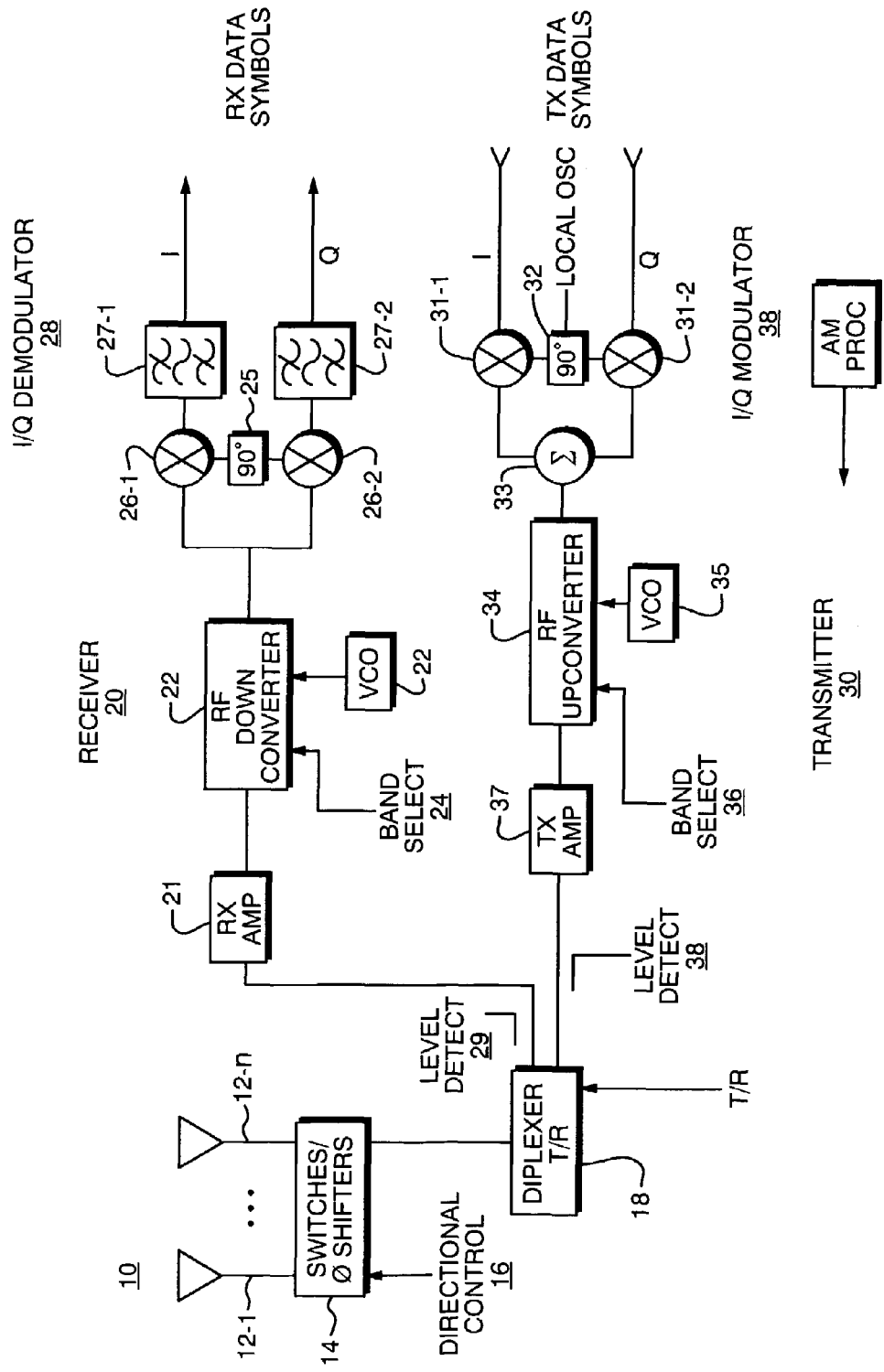
FIG. 1 is a block diagram of a Time Division Duplex (TDD) radio transceiver that may be used to implement the present invention.

Turning attention to FIG. 1, a typical TDD/CDMA type transceiver utilized in the equipment (UE) is shown in a high level diagram. The transceiver consists of an antenna subsystem 10, a receiver subsystem 20, and a transmitter subsystem 30.

The antenna 10, in accordance with the preferred embodiment of the present invention, is a directional type antenna. It therefore consists of multiple radiating elements 12-1, . . . 12-n connected through a directional controller 14. The directional controller 14 accepts control inputs 16 to set a transmit or receive direction for the antenna elements 12. The directional controller 14 may consist of switches, phase shifters, or other components such as lumped impedances, to affect directivity of the combination of the antenna elements 12 in various ways that are known in the art.

A diplexer 18, in the case of a TDD system properly thought of as a transmit/receive switch 18, allows both the receiver 20 and transmitter 30 to be connected to the antenna subsystem 10.

The receiver 20 consists of a receive amplifier 21, radio frequency (RF) down converter 23, Voltage Controlled Oscillator (VCO) 22, and an in-phase and quadature demodulator 28 that consists of a phase shifter 25, a pair of mixers 26-1, 26-2 and a pair of band pass filters 27-1, 27-2. In a manner which is well known in the art the receive amplifier accepts a received signal, amplifies it, and then provides it to the RF down converter 23.

Given an input frequency from the VCO 20 and possibly band select inputs 24, the RF down converter 23 shifts the incoming radio energy to intermediate carrier (IF) frequency signal. The I/Q demodulator 28 then provides receive data symbols as output in both an in phase (I) and quadrature (Q) channels.

For the transmitter 30, transmit data symbols are provided to an I/Q modulator 38 that itself consists of a pair of mixers 31-1, 31-2 quadrature phase shifter 32 and summer 33. Fed by a local reference signal, the I/Q modulator 38 provides a modulated signal to at an IF frequency to RF up converter 34. The transmit VCO 35 and any band select inputs 36 then up-convert the IF signal to a desired RF carrier frequency. The transmit amplifier 37 then provides the modulated transmit signal to the diplexer 18, which is in turn controlled by a transmit receive (T/R) input. A level detector circuit 38 may be used to detect the transmitted RF power level. The T/R input is controlled according to time slot allocations provided by the Base Station on a control channel. During some time slots, the diplexer 18 is set to receive mode (i.e., the downlink is active); at other times it is set to transmit mode (i.e., the uplink is active); and at still other times it is left open (inactive timeslots). A similar a level detect circuit 29 may also be used to determine the receive level detect signal level.

Figure 2:
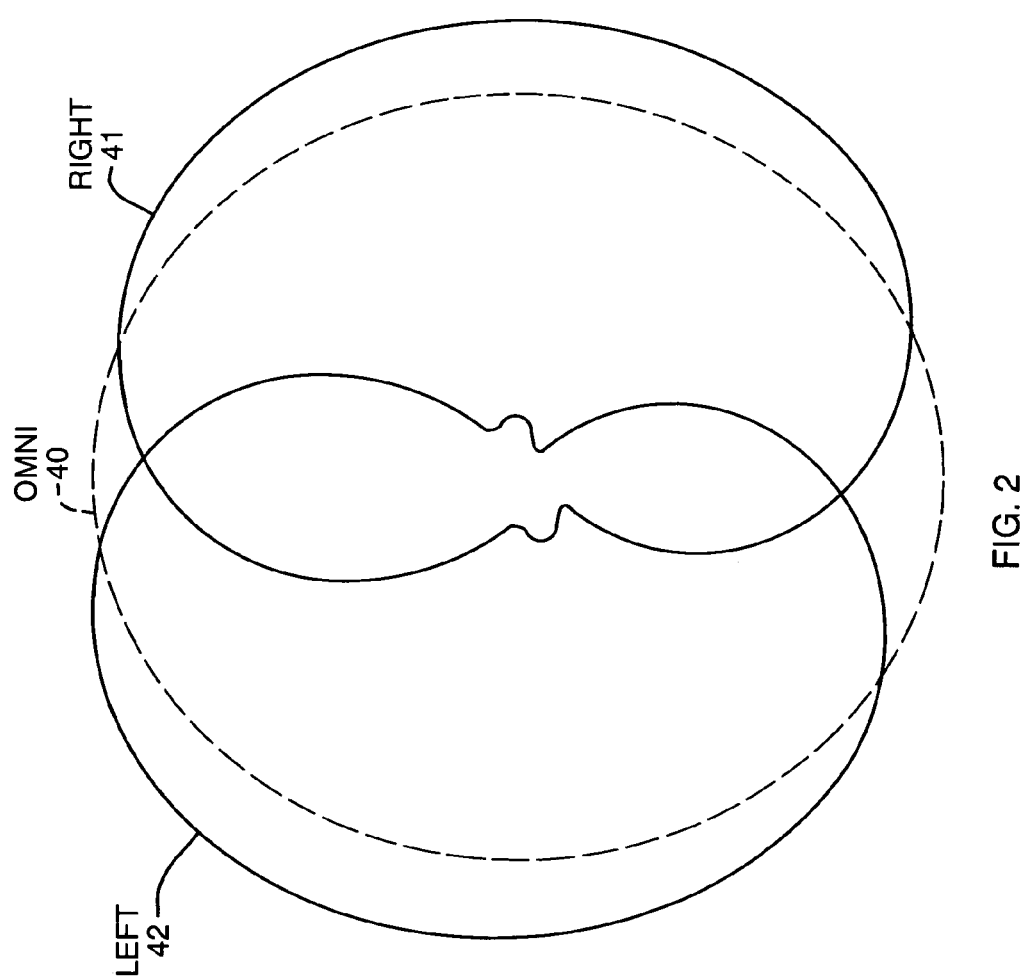
FIG. 2 is an antenna radiation pattern illustrating three different selectable modes.

In accordance with this particular embodiment, the antenna subsystem 10 has three modes selectable by the directional control input 16. Turning attention to FIG. 2 these modes may be an omni directional mode, where the antennas 12 generally behave to provide an omni directional transmit/receive pattern that is relatively the same strength in all asimuthal directions. A second mode of the antenna 10 is illustrated by the right hand pattern 41 provides a radiation pattern that is generally towards right hand side of the asimuthal plane. Similarly, a third setting for the antenna 10 provides an antenna pattern 42 that is generally towards the left hand side of the asimuthal plane. Thus, by appropriate inputs applied to the directional controller 16, the antenna 10 may be set in one of three pointing modes (omni, directional right hand, or directional left hand). Antenna systems that may be utilized for this are well known in the art. For one example one can refer to U.S. Patent Publication No. 2003/0048226A1 filed by Tantivy Communications, the assignee of the present application. While this embodiment uses only three antenna modes, it should be understood that other embodiments could use a greater number of modes.

Figure 3:
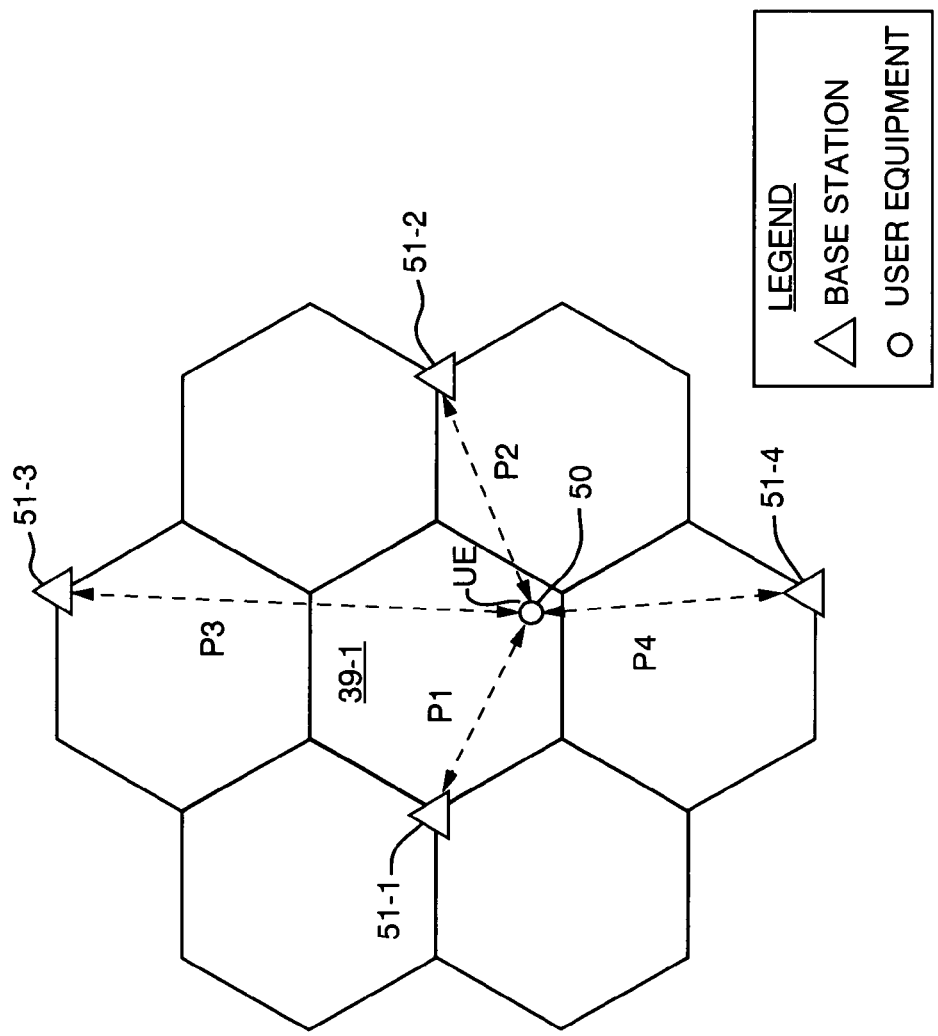
FIG. 3 shows different power levels on both uplink and downlink for a typical scenario.

FIG. 3 illustrates a typical situation in a cellular wireless environment where centralized Base Transceiver Stations (BTSs) are utilized. The user equipment (UE) device is situated often times in one corner of a particular cell 39-1. The UE in this situation may detect a pilot channel signal primary BTS 51-1 with a power level P1. However it is also possible for the UE to detect signals associated with other adjacent BTSs such as BTS 51-2 at power level P2, BTS 51-3 at power level P3, and BS 51-4 at power level P4. It can be appreciated therefore that the neighboring BTSs 51-2, 51-3 and 51-4 all can contribute to interfering with desired reception of signals from intended BTS 51-1 but may also interfere with transmissions from UE to its intended BTS 51-1 as well. Therefore various solutions which take into account the directional nature of the antennas 10 can be used to optimize overall system performance.

Figure 4:
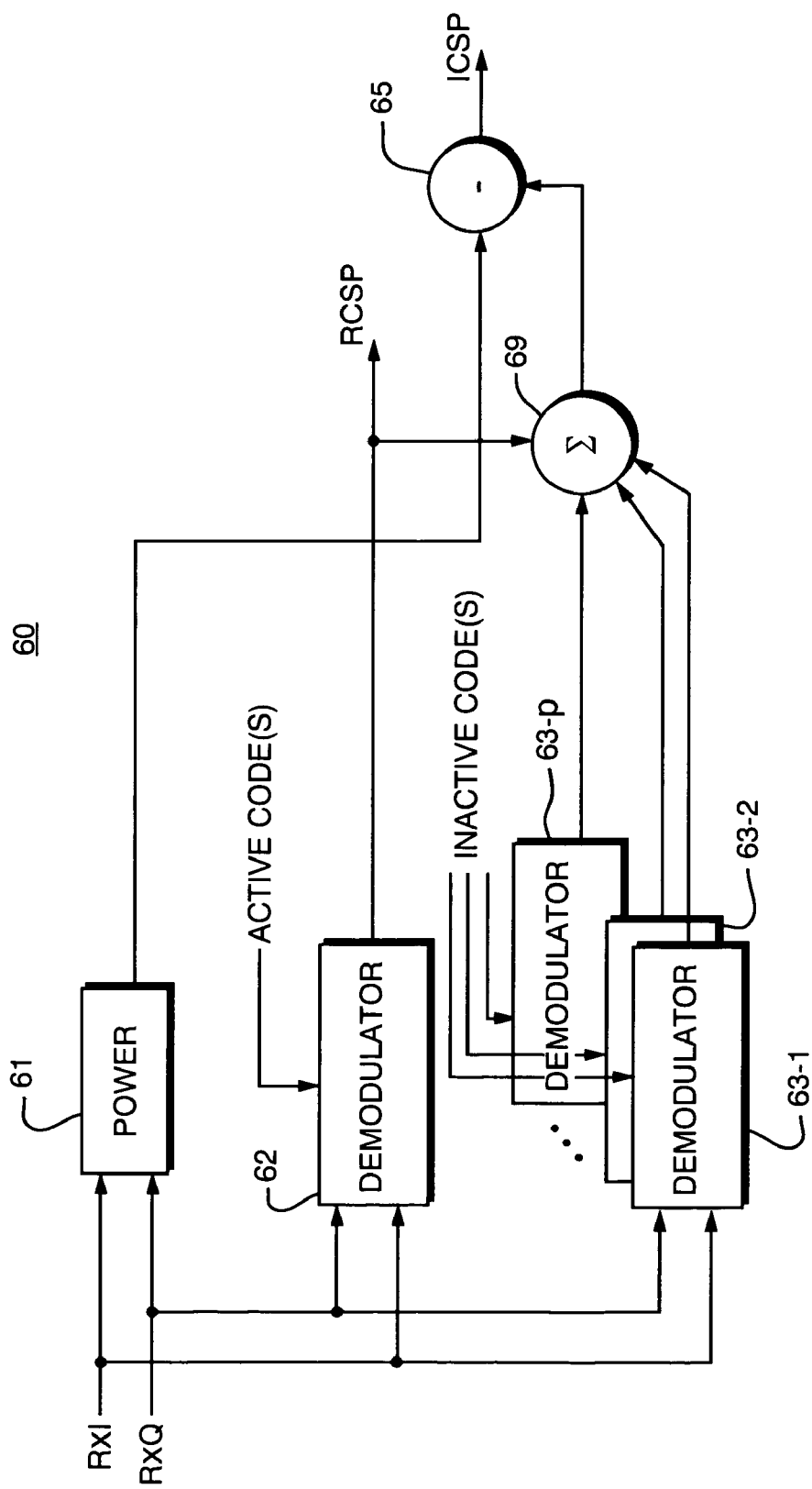
FIG. 4 illustrates how receiver signal strength and interference signal strength measurements are taken by the receiver.

Algorithms envisioned by the present invention utilize a measure of receive signal power and interfering signal power as measured at the UE. These can be provided by additional receive circuitry as shown in FIG. 4. The receive circuitry 60, may take the receive I channel (RxI) and receive Q channel (RxQ) and feed them to a typical power level detector 61. The RxI and RxQ signals may also be feed to demodulator 62 which is fed the active CDMA code for the particular channel. The demodulator 62 thus provides a measure of the Receive Code Signal Power (RCSP).

An estimate of received interference power that is associated with adjacent base stations 51-2, 51-3, 51-4 can be provided by additional demodulators 63-1, 63-2, . . . 63-P, summing circuit 64, and subtractor circuit 65. That is, by applying the additional demodulators having applied thereto inactive CDMA codes from BTS 51-1, that is the codes for channels that are not presently utilized by the UE, a relative signal power of such intracell interfering channels are individually provided by taking their sum in summing circuit 64. This is then removed from an estimate of the overall receive power (by subtractor circuit 65) to estimate the interfering code channel signal power (ICSP).

Figure 5:
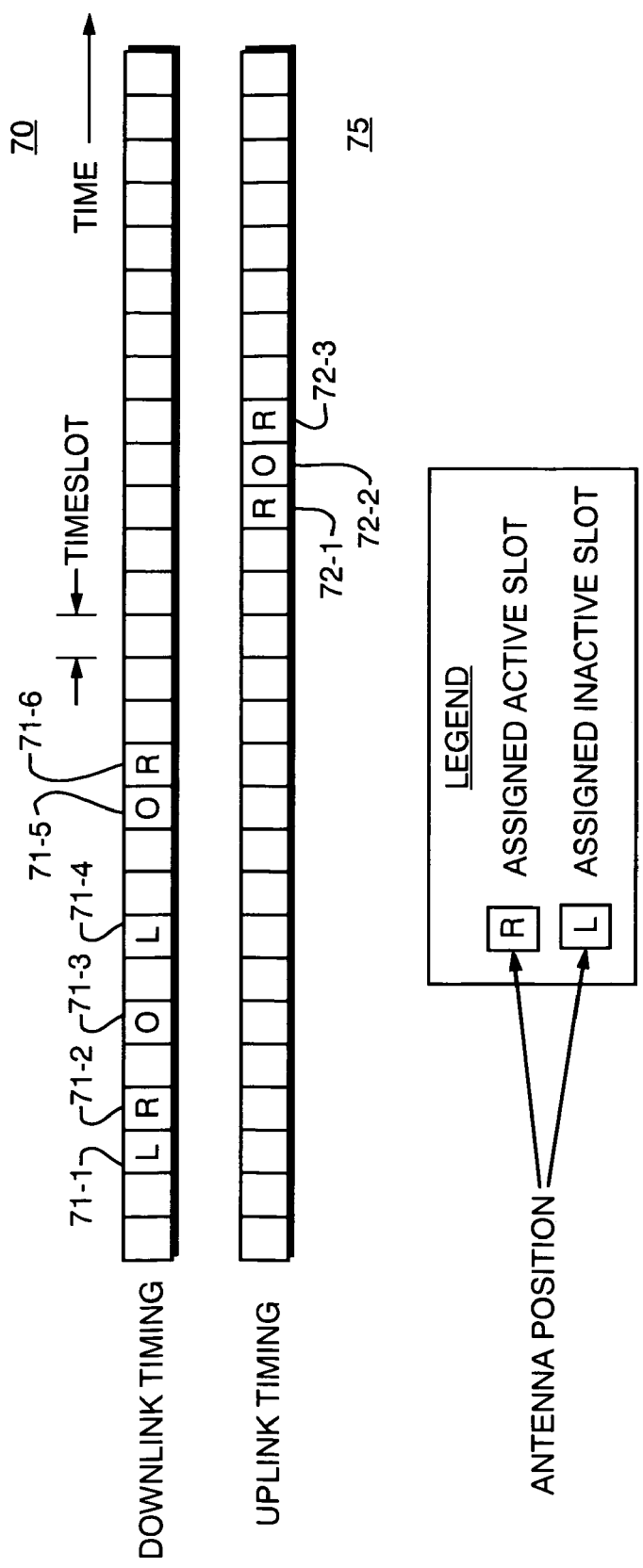
FIG. 5 shows a typical assignment of downlink and uplink time slots, illustrating that during certain assigned timeslots, the uplink requires directional settings during other timeslots, and that measurements may also be taken during assigned but inactive slots.

It can now be appreciated that the invention will need to select an optimum antenna mode setting for every particular active time slot in both the uplink (UL) and downlink (DL) directions. FIG. 5 is a high level diagram of the situation. A downlink timing diagram 70 is illustrated together with an uplink timing diagram 75. The downlink timing 70 and a UTMS WCDMA frame is assigned as follows. A frame has an overall duration of 10 milliseconds (ms) and is subdivided into 15 timeslots (ts) of 2560 times the code chip time (tc) of 3.84 mega chips per second (Mc/s). A time slot thus corresponds to 2560 chips of the CDMA spreading code. The physical content of the timeslots are bursts of a corresponding length described in the W-CDMA specification at subclause 5.2.2. Each of the time slots can be allocated to either the uplink (UL) or the downlink (DL). With such flexibility, the Time Division Duplex capability can be adapted to different environments and deployment scenarios. In any configuration, at least one time slot has to be allocated for the downlink and at least one time slot has to be allocated for the uplink in each frame.

An example situation may develop therefore as shown in FIG. 5 where adjacent timeslots 71-1 and 71-2 are optimally pointed to in the left mode and then in the right mode successively. A subsequent time slot 71-3 may require optimization by having the antenna in the omni directional setting whereas a following slot 71-4 (after an idle slot) may need to be optimally pointed in the left mode. Similarly, in an uplink direction, adjacent time slots 72-1, 72-2 and 72-3 may require setting the antenna in the right, omni, and then right modes, respectively. What should be taken away from FIG. 5 is an understanding that an antenna position is associated with each active time slot, and also that inactive timeslots such as shown in the unshaded portions 71-5 and 71-6 may also be utilized to take measurements according to the present algorithm.

Figure 6:
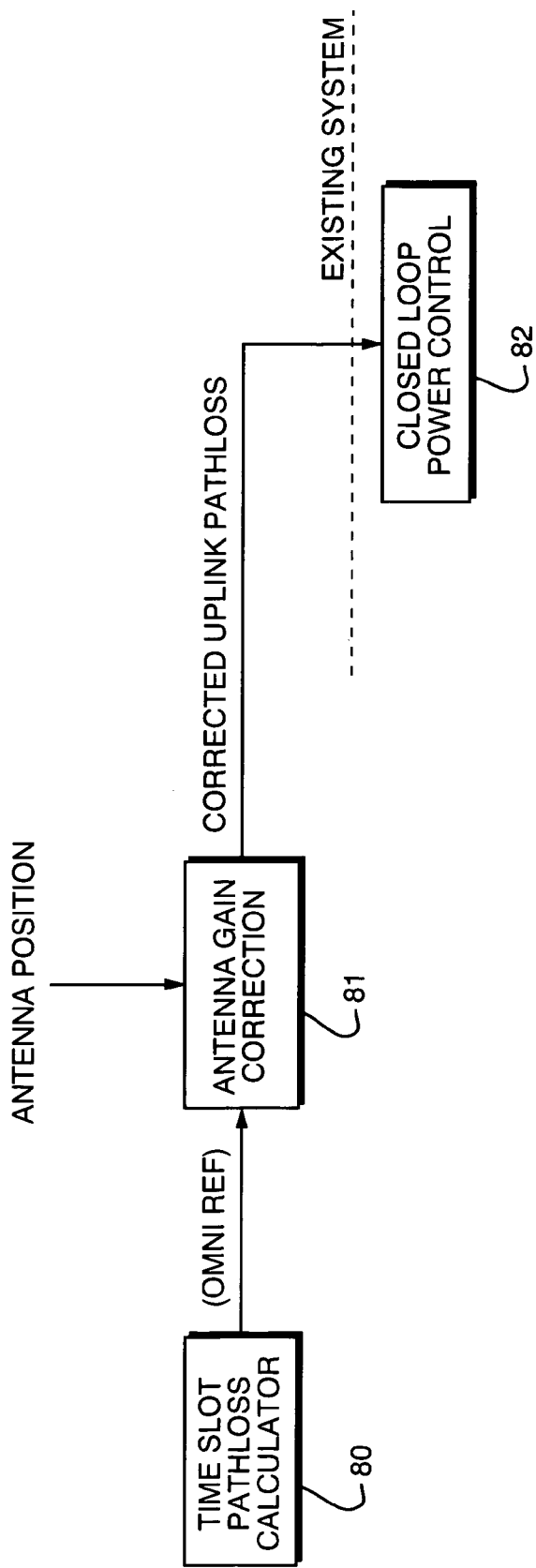
FIG. 6 is a diagram illustrating how a timeslot path loss calculator may be used to develop a gain correction that accommodates antenna position, in turn can be applied to closed loop power control.

The overall result of applying an algorithm according to the present invention is that not only is the antenna position optimized, but also that a corrected path loss calculation may be made. Specifically, as shown in FIG. 6 a time slot path loss calculator is typically utilized to provide a path loss associated with an omni directional setting of receive antenna. However since the gain of the antenna varies according to its directional mode, an antenna gain correction step 81 should be taken in order to correct any uplink path loss estimates. Thus, given an antenna position setting an antenna gain correction 81 can be applied to correct uplink path loss estimates which may then be applied to close loop power control algorithms 82. The invention thus not only provides for increase sensitivity in reception of signals, but also provides for further advantages, to optimize closed loop power control processing.

Figure 7:
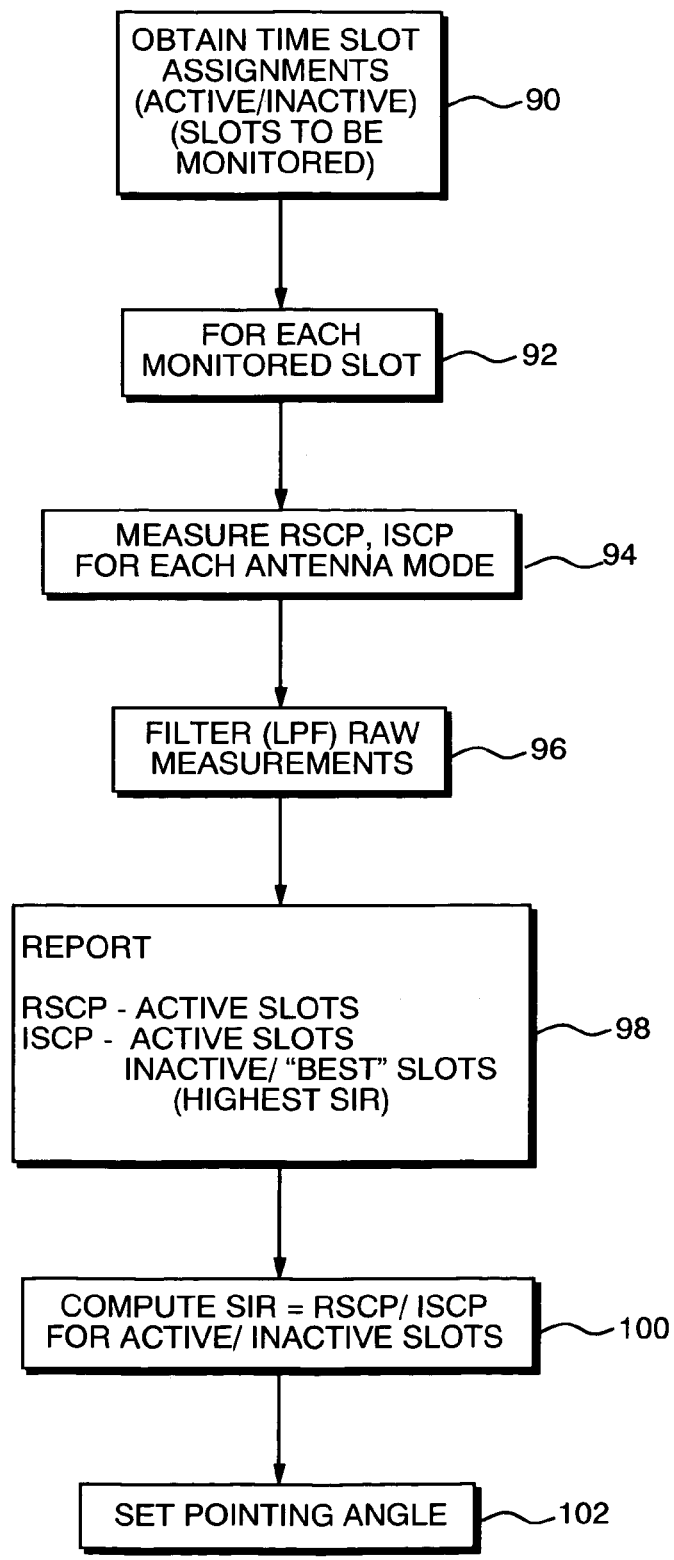
FIG. 7 is a more detailed flow diagram of a downlink (DL) antenna direction algorithm.

FIG. 7 is a flow chart of steps that may be utilized in order to determine an optimum antenna setting in the down/link (DL) direction, that is, for receiving signals at the user equipment as transmitted by the Base Transceiver Station (BTS) (also called the Node B in the W-CDMA specification).

In first step of the method, time slot assignments are obtained. These assignments are for both assigned active slots and assigned inactive slots on the downlink as was described in connection with FIG. 5. This then provides a total number of time slots that are to be monitored by the process. The time slot assignments would be typically made by the Node B or other centralized controller in a manner that is appropriate for the present user equipment based upon conditions that the Node B is aware of.

A next step for each monitored slot at state 92 at state 94 both the RCSP and ICSP are measured for each antenna mode. Thus, the antenna 10 is temporarily set in each of the three modes omni directional, right or left and both RCSP and ICSP are determined.

In the state 96, the RCSP and ICSP measurements for each mode of the antenna may then be filtered through appropriate low pass filtering and/or averaging calculations.

In state 98, the User Equipment (UE) then sends a report back to the Node B of these measurements. These would include at least the RCSP as measured for the active time slots as well as the ICSP as measured in both the active slots and inactive slots. This allows the Node B to determine the signal to interference ratio for active slots. With this information, it can then therefore assign active slots to User Equipment (UE) based upon observed signal to interference ratio (SIR) taken with various antenna settings.

From this state, in state 102 the best pointing direction can then be determined by computing SIR as a ratio of RCSP to ICSP for active and inactive slots. That is, the RCSP is taken for active slots and the ICSP measurements are taken from inactive slots (where it is known that only interference signal power was present). In this manner, an optimal antenna setting either omni directional, left or right can be determined from measurements taken.

The RCSP and ISCP active slot measurements in the downlink (DL) direction for other antenna pointing directions may be taken on appropriate signals and during times, for example, when no critical user data is being sent. This may be taken during transmission of pilot synchronization, or similar signals but it should be understood that the measurements can also be taken on data signals and in other instances.

Figure 8:
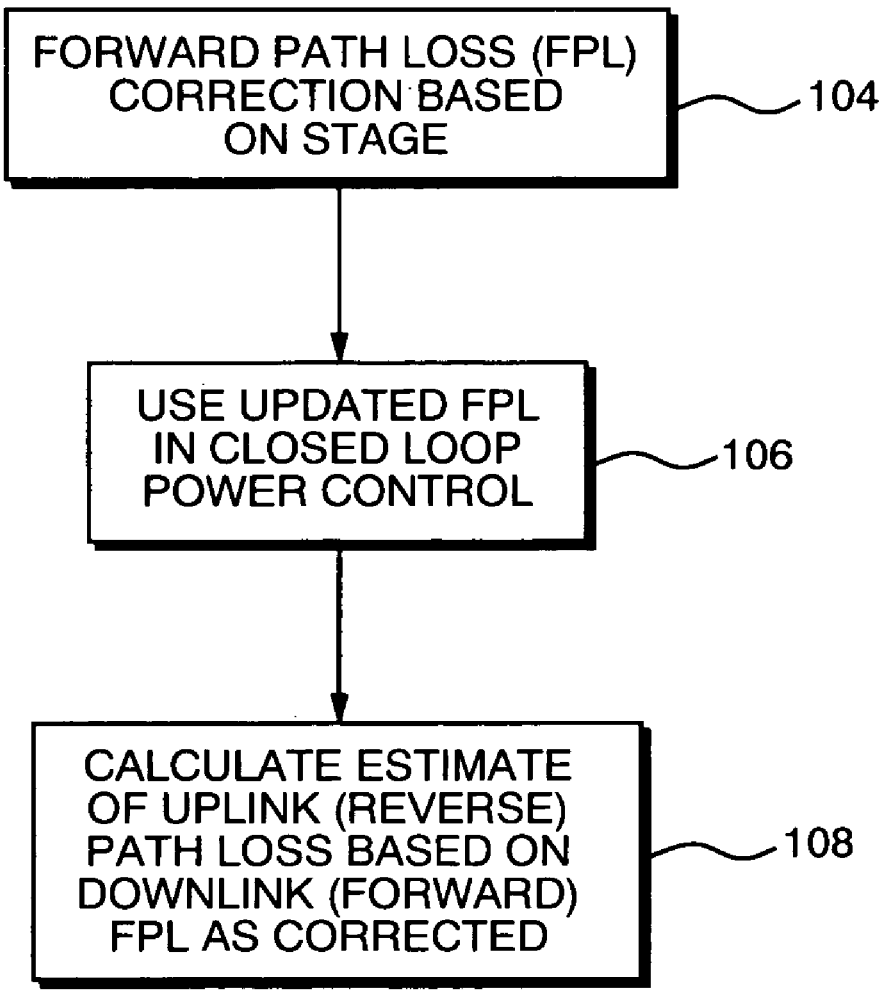
FIG. 8 is a high level flow diagram of how the forward path loss connections can be applied to power level setting controls.

Given a directional setting for the antenna, the forward (DL) path loss can then be estimated as shown in FIG. 8. That is, a gain for given antenna is now known. This updated antenna gain setting can then be used to correct a forward path loss estimate (FPL) that is then utilized in a closed power control algorithm, in state 106. As an example, it is often the case in closed loop power control algorithms that an estimate of uplink (that is reverse direction path loss) is made based upon downlink (forward) path loss measurements. Once the base station knows its transmit power level, and a power level at which a signal was received by the remote unit (as reported back) can then calculate how much energy was lost through the transmission. Typical power control algorithms then must make an estimate of the uplink, that is reverse direction, path loss based upon the downlink measurements. In this particular situation, given that the antenna will be experiencing different gain based upon its angle setting, the angle setting can be used to provide a corrected gain value which is then used to correct uplink path loss.

In another manner of thinking, the estimate for path loss for both directions must be corrected. The forward link adjustment is used to correct path loss for antenna gain. Secondly, a reverse link adjustment is used to correct an actual reverse link transmit power level setting at the user equipment, the next time the user equipment attempts to transmit back to the base station.

Figure 9:
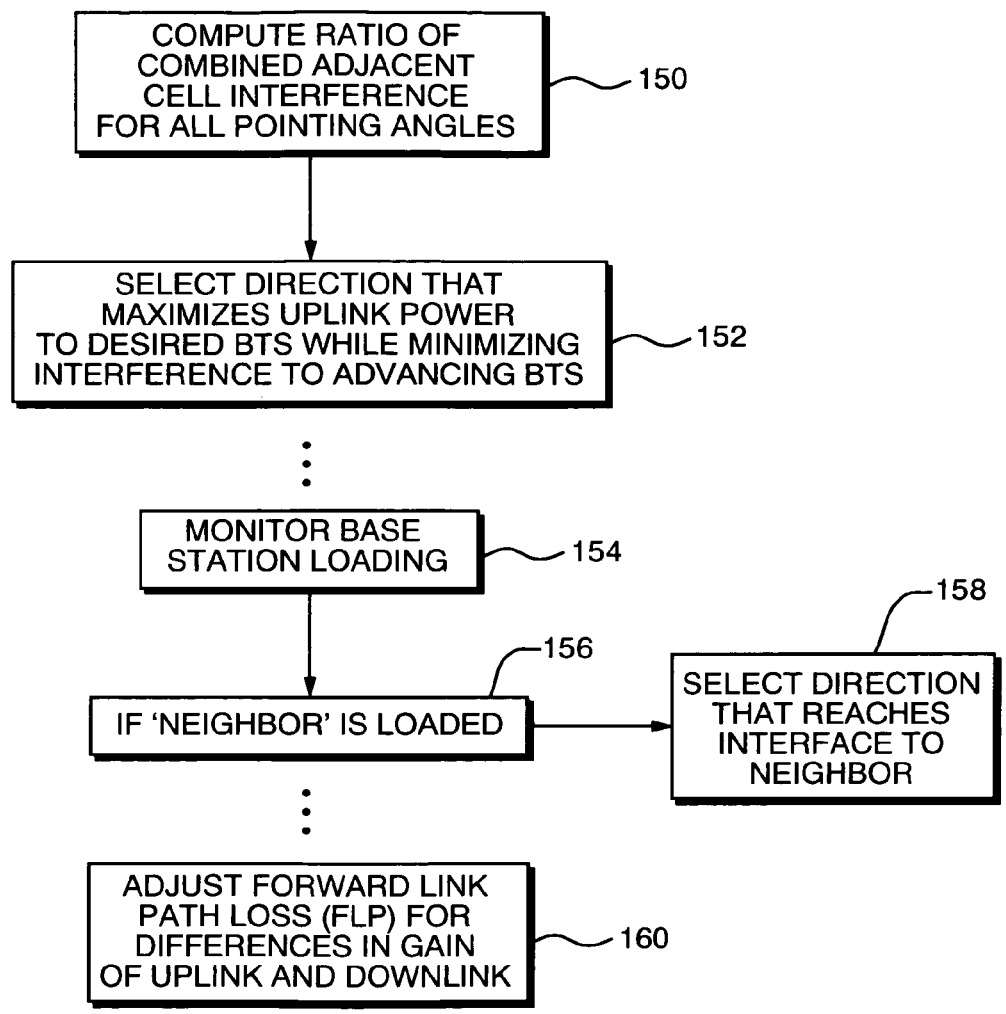
FIG. 9 is a flow diagram of an uplink (UL) antenna pointing algorithm.

FIG. 9 is a flow diagram of a sequence of steps that may be used to determine an optimal pointing angle for an uplink that is when the user equipment is used to transmit. In a first state 150, a measurement of adjacent cell interference is determined for all pointing angles. That is, the common control channel signal for adjacent BTSs (51-2, 51-3, 51-4) is measured for all pointing angles. In a state 152 a direction is selected so that it maximizes the uplink power to the desired BTS 51-1 during transmission while minimizing interference to adjacent BTSs 51-2, 51-3, 51-4. That is, in state 150 the user equipment determines the reverse link pathloss to adjacent BTSs and then calculates an interference level, caused by transmissions from the UE, for each of the possible antenna angle settings. The overall best setting is then selected as the setting which maximizes the power to the desired base station 51-1 while minimizing the interference levels to the adjacent levels to the adjacent BTSs 51-2, 51-3 and 51-4. This concept will be described in further detail below connection with the description of the embodiment of the invention utilized in UMTS W-CDMA.

In alternate schemes, the base station loading of adjacent base stations may also be monitored in the state 154. That is, each base station may periodically broadcast a data indicative of how relatively busy it is, that is how many timeslots it is active in. If, in state 156 a neighboring base station is detected as being particularly loaded, then a direction is selected in state 158 that reduces interference to that particular neighbor. Thus, for example, the user equipment (UE) may determine that an adjacent base station 51-3 is particularly busy, having most of its time slots assigned to an active state. If this particular neighbor is relatively busier than other neighboring base stations, and especially if the presently assigned base station is not particularly busy, then a direction will be selected which reduces interference to the busy neighboring base station. This may therefore improve the overall system performance with minimum degradation to the desired link between UE and the desired base station 51-1.

Again, even in the uplink direction, the path loss calculation should be adjusted for differences in gain of the uplink and downlink antenna direction settings, as in step 160.

Figure 10:
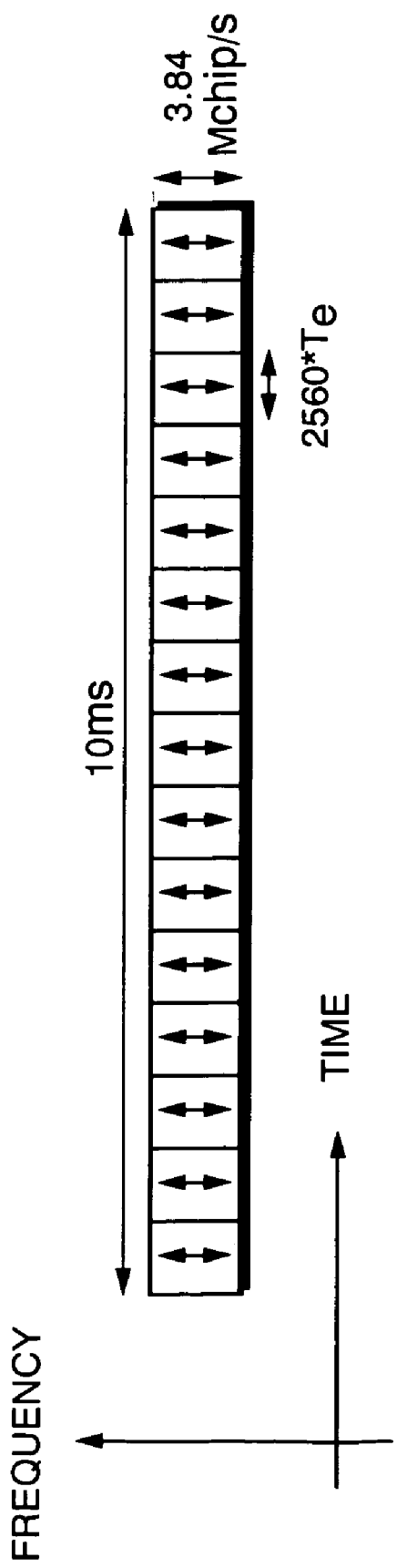
FIG. 10 illustrates how time slots may be defined for the uplink and downlink.
Figure 11A:
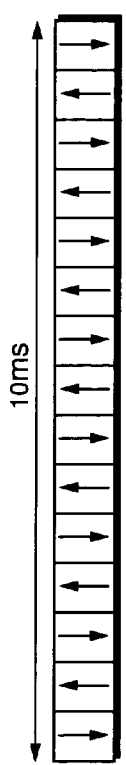
FIGS. 11A, 11B, 11C and 11D illustrate various schemes for allocating uplink and downlink slots in different switching point configurations.
Figure 11B:
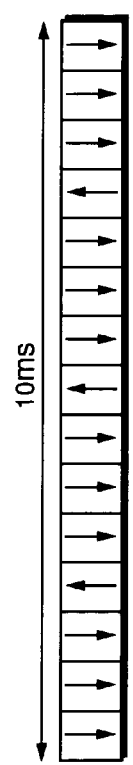
Figure 11C:
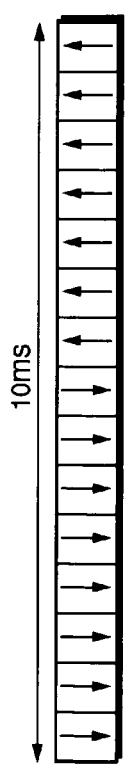
Figure 11D:
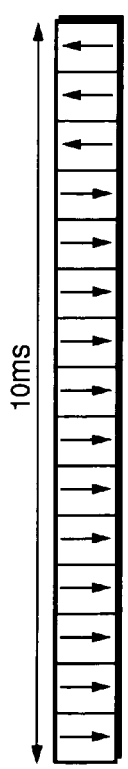

FIG. 10 illustrates one scenario where both uplink and downlink directions may be utilized in a duplex system, that is in a system in where both uplink and downlink time slots are active during each time slot (TS). However, other arrangements are typical and possible as shown in FIGS. 11A, 11B, 11C and 11D. Respectively, these show time slot allocations among uplink and downlink for multiple switching point configuration with symmetric uplink and downlink allocation; multiple switching point configuration with asymmetric downlink and uplink allocation, and single switching point configuration with symmetric downlink and uplink allocation and single switching point configuration with asymmetric downlink and uplink allocation.

In a TDD system, some sort of steering of the array must therefore be achieved in order to implement the optimized antenna setting. The steering of the array may be performed by software sending messages to the directional control 16 inputs if the software is fast enough. However, if the software cannot execute quickly enough, a hardware state machine that operates under control of the software may be needed. This Array Setting Coprocessor (ASCP) may be as simple as a register that contains the value for the next time slot. In such an embodiment, the values would be readout at the correct time.

A more sophisticated ACSP may require multiple registers that include the values for the next N array positions to be set. The software could write to this register prior to the actual arrival of the time slots. At the correct time, the ACSP would then apply the settings to control inputs 16 on the antenna array.

Figure 12:
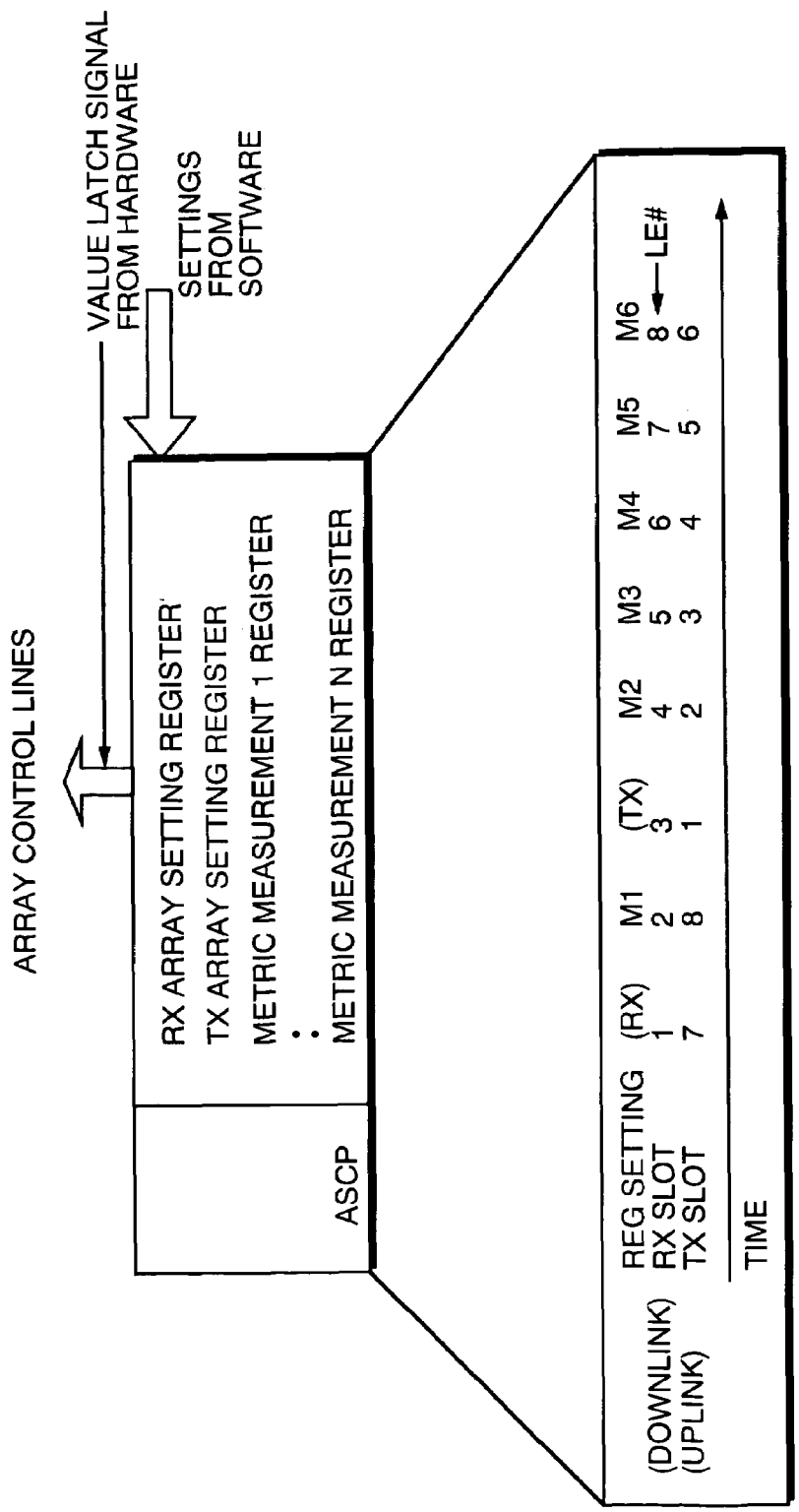
FIG. 12 illustrates an array controller and possible time slot assignments in more detail.

An example of a more sophisticated ACSP is shown in FIG. 12. This multiposition operates similar to the above described controllers, but allows for multiple registers that each contain a setting value to be applied at different times. Such an implementation of the ACSP has multiple registers including registers for receive mode (downlink) as well as transmit (uplink) assigned time slots. The array registers can be all set at the same time, at once, or individually modified as needed. It can also be double buffered to allow for writing at any time, again as dictated by the timing constraints of the software.

Further aspects, as suggested by FIG. 12, recognize that uplink time slot assignments may be offset in time by a fixed interval from the downlink assignments. In this environment, the diplexer 18 would be set to always switch between transmit and receive modes at predetermined times. As shown in the timing diagram of FIG. 12, a particular User Equipment (UE), identified as unit number 1, would be active in the first illustrated time slot in the downlink direction and would be active in the uplink direction two time slots later. The ACSP logic would thus always know to switch between transmit and receive mode on alternate time slots on a beginning of a frame. Adopting a slightly more rigid structure on the assignment of uplink and downlink time slots, thus can contribute to simplifying the ACSP architecture.

Description for UMTS-TDD

The reader will now appreciate a more detailed description of how the invention can be used in a UMTD-TDD system environment. The following discussion assumes the reader is familiar with that specification, and the various channels it defines.

1. Steady State

As defined in the above-referenced W-CDMA specification, the steady state case is either CELL_FACH or CELL_DCH. CELL_DCH is the state in which the UE is actively engaged in voice and or data traffic. DL and UL slot/code/power allocations may be changing under RRM control and the UE may be mobile. CELL_FACH is the state in which the UE does not have allocated resources, noise measurements are being reported for a future allocation by RRM, and the UE may be mobile.

1.1 Downlink

The algorithm concept outlined in FIG. 7 and detailed below assumes that for the DL direction, the antenna 10 is steered based on maximizing the signal to adjacent cell/sector interference ratio (SIR). As described above briefly, making steering decision based on SIR requires a measurement of the desired signal (RCSP) and the adjacent cell interference (ICSP) for both active slots (those carrying traffic for the UE) and non-active slots. SIR (i.e., RCSP/ICSP) measurements for active slots are required to keep the best steering direction when the UE is mobile and/or slot allocations may be changing on the adjacent sector or cell. SIR measurements for inactive slots are required to provide the correct steering direction if that slot should it become active in a future allocation. Measurements of RSCP (Received Signal Code Power) for the P-CCPCH signal and ISCP (Interference Signal Code Power) for dedicated time slots are typically made.

1.1.1 RX Signal Power Measurements

Signal power measurements are also made by the UE in support of other RRM functions or a common control channel pilot power signal, P-CCPCH RSCP. The addition of a directional UE antenna requires that the P-CCPCH RSCP measurements be made at all possible pointing directions of the antenna. If a three-mode antenna is used with the UE, the P-CCPCH RSCP measurements must be made in the omni mode, left beam, and right beam mode. The P-CCPCH RSCP measurements are made only on slots on which the UE is receiving data (CELL_DCH) on either traffic or broadcast channels. With a directional antenna, this measurement will be for a selected one of the three beam positions (omni, left, right). The measurements for the other two directions can be made on the P-CCPCH when the UE is not required to receive data, since SIR in those directions may be degraded as compared to the current direction. Since the P-CCPCH is always sent from the base station with the base station antenna in omni mode, measurement of the P-CCPCH receive power at other positions during non-active slots will be the same as the P-CCPCH receive power of the active slot at that same direction (assuming the slots are close in time, and assuming that some amount of averaging is done as in step 96 (FIG. 7), etc.).

1.1.2 Intercell Interference Measurements

Intercell interference measurements are also made by the UE in support of RRM through time slot ISCP measurements. For the purposes of this discussion, ISCP is assumed to provide intercell interference power only. The directional UE antenna requires that the time slot ISCP measurements be made at all possible pointing mode directions of the antenna. If a three mode antenna 10 is used with the UE, the ISCP measurements thus are made in the omni, left beam, and right beam modes for each possible interfering code. For measurements of the active slot(s), the measurement can only be made at the current pointing position (although, steering the antenna would upset the receptor of an active channel). By definition, other positions for the active slot will have degraded SIR, so attempting to receive data (CELL_DCH) at other positions may tend to degrade performance.

1.1.3 RX Signal Power Reporting

P-CCPCH RSCP measurements are also reported to the Radio Node Controller (RNC) periodically for power control, and for DL and UL time slot allocation purposes. With a directional antenna such as the three mode array 10, three different measurements are made of RSCP. All three measurements are used by the UE in determination of the future pointing directions for the antenna, but only the RSCP measurement of the current pointing direction is reported to the RNC. The raw RSCP measurements undergo various levels of filtering (step 92) before they are used by the UE for reporting (in step 98). The RSCP measurements for all directions are filtered in the same way as the current implementation, regardless if it is used for reporting or not. The reporting uses the average associated with the current pointing direction.

1.1.4 Intercell Interference Reporting

Time slot ISCP measurements are also reported to the RNC periodically for forward channel (DL) allocation purposes. The RNC specifies the time slots that are to be measured. With the three mode directional antenna, three different measurements are made of ISCP for each time slot. If the ISCP slot report is for an active slot (a slot being used by the UE), the ISCP value reported is the value taken from the current pointing direction of the antenna. If the ISCP slot report is for a non-active slot (a slot under consideration for future assignment), the ISCP value reported is the value taken from the direction of the antenna that provides the highest SIR. The raw ISCP measurements undergo various levels of filtering before they are used by the UE for reporting. The ISCP measurements for all directions and all slots are filtered in the same way as the current implementation, regardless if it is used for reporting or not. The reporting step 98 thus uses the average associated with current pointing direction for active slot ISCP reporting, and the average associated with the direction of maximum SIR for non-active ISCP slot reporting.

1.1.5 Pointing Direction for Active Slots

The current pointing direction of the UE antenna is determined by computing the SIR (ratio of RSCP to ISCP) for the active slot or slots for all pointing directions. The antenna position is then adjusted to point in the direction of highest SIR, just prior to the next slot time. The RSCP and ISCP values reported for the active time slot would be those values used to determine the SIR for the direction selected. It should be noted that if the Node B (the assigned Base Transceiver Station) is itself using directional beam former antennas, the SIR computed by the antenna steering algorithm will not be the same as the SIR maintained by thresholds in forward power control, since the RSCP for the P-CCPCH will be calculated with the base station transmitting in omni mode. However, since the directional antenna is reducing adjacent cell interference, the SIR trend over pointing directions with the Node B transmitting in omni should be the same as the SIR trend over pointing directions with the Node B transmitting with a beam former in relative terms.

1.1.6 Pointing Direction for Non-active slots

Every non-active DL slot measured by the UE will have an independent pointing direction. The pointing direction for non-active slots is the direction providing the highest SIR. If a non-active slot is allocated to the UE, the antenna position is then adjusted to point in the direction of the highest SIR just prior to the slot time. That slot is then considered an active slot.

1.1.7 Forward Path Loss

As we mentioned with FIG. 6, integration of the directional antenna affects calculation of forward path loss because there is a gain difference between the directional patterns and the omni pattern. As the antenna is switched between omni mode and a directional mode, the forward path loss will appear to change unless this is compensated for. This difference in gain can be computed based on the difference in RSCP measured for the omni mode and in RSCP measured for each of the two directional modes. This gain difference should be measured and not estimated since the exact gain difference between omni mode and directional mode depends on the angle of arrival at the directional antenna.

1.1.8 Closed Loop Forward Power Control

Integration of the directional antenna also affects forward (DL) power control when the antenna direction is changed for an active slot. The forward (DL) power control will potentially see a step change in forward power and more importantly a step change in SIR when the position is adjusted. If the antenna position is changed, the new position will have a higher SIR than the current position (or the position change would not have been made). The tendency will be for the forward (DL) power control loop to reduce power when the antenna position is changed. The reduction will take place over some period of time. During this period of time the link will operate above the target SIR (better link) until the forward (DL) power control recovers. Also during the forward (DL) power control loop adjustment period, the measurement averages of RCSP for the slots can continue, since those measurements are made on P-CCPCH, which is transmitted at a constant power.

In cases in which the UE is assigned multiple downlink slots, the direction for each slot could be different. Since the SIR for each slot is different even with an omni antenna, it is assumed that the forward power control maintains a set of variables for each downlink (DL) slot, such that the link performance is maintained independently for each slot. The directional antenna switching time is less than 100 ns, so the forward power control would not be affected on slot-to-slot direction changes if each slot were controlled independently. If a multi-slot allocation were controlled as one slot, the ISCP and RSCP values for the multi-slot would have to be averaged to determine a compromise direction for all the slots in the allocation. Otherwise the forward (DL) power control would be attempting to compensate for antenna direction changes.

1.1.9 AGC Attack Time

The Automated Gain Control (AGC) circuitry associated with receiver amplifier 21 (FIG. 1) in a TDD implementation is subject to much greater power transients than in a FDD implementation, and should be designed to handle them. In addition to the normal slot-to-slot variation in power, the UE AGC will see additional step changes in the received signal with a directional antenna integrated. Due to the gain differences between omni and directional patterns and more importantly the large front to back ratio of the directional antenna, the UE AGC could potentially see 6-8 dB changes in input power in addition to the slot-to-slot variation encountered with an omni antenna. As previously stated, the AGC for a TDD implementation should be able to accommodate the additional variations in signal strength caused by the integration of a directional antenna.

1.2 Uplink (UL) Steering

The UL can be steered based on maximum received power at the Node B or on a set of metrics that minimizes the adjacent cell interference caused by the UE. Depending on the excess UE transmit power available, the UL steering algorithm may be a combination of the two. In cases where the UE is near maximum output power, the steering should be based on maximizing the receive power at the Node B. However, in cases where there is excess power available, the pointing direction should be such that it minimizes the adjacent cell interference caused by the UE.

Use of the directional antenna on the UL can mitigate intercell interference at an adjacent base station by minimizing the amount of energy a UE transmits to an adjacent cell. Two algorithms could be used to point the UL to minimize intercell interference. The first approach is to measure the UE transmission at all adjacent Node B's and determine the direction which maximizes the signal to adjacent cell interference. However, this requires coordination between not only adjacent Node B's but also between the Node B and the UE. A second preferred algorithm, described below, relies on the reciprocity between the uplink and downlink path losses to measure the forward path losses from adjacent base stations and infer the reverse link path losses. A pointing direction can be determined which maximizes the ratio of desired Node B power to adjacent Node B power(s). If the intra-frequency search algorithm is modified to accommodate the directional antenna then many of the necessary calculations are already available. The data for this algorithm is available in the UE and does not require coordination with the Node B.

There will be times when minimizing the adjacent cell interference on the UL will result in the loss of receive power at the desired Node B. If the UE is operating at near maximum path loss, any loss of received power at the Node B would be detrimental to performance of the UE. Under this condition, the UL should be steered solely on received power at the UE to maximize the UL power at the Node B.

1.2.1 RX Signal Power Measurements

The UE measures the DL power at all pointing directions, assumes reciprocity, and thus infers what the UL receive power will be at the Node B for a specific direction. RSCP for the P-CCPCH at all pointing directions is already being measured for the DL pointing algorithm. For each pointing direction, the UE will calculate an estimate of reverse link path loss to its Node B, based on a measurement of forward link path loss (through RSCP) at every pointing direction.

1.2.2 Intercell Interference Measurements

During assigned but idle time slots, the UE measures the DL power at all pointing directions for adjacent base stations, assumes reciprocity, and infers what the UL receive power will be at those Node B's, for a specific pointing direction. RSCP for the P-CCPCH must be measured for the adjacent Node B's during intra-frequency searching for potential handoff. Once the directional antenna is integrated, the intra-frequency search must also take into account the RSCP for adjacent Node B's at all pointing angles. Thus the data required to support intercell interference measurements on the UL can be obtained from the searcher. For each adjacent Node B, the UE will compute the reverse link path loss at all available pointing angles. This data will be used to determine the pointing direction for the UL.

1.2.3 Pointing Direction

As mentioned in connection with FIG. 9, two pointing directions will be selected for the UL. One direction will be based on maximizing the received power at the Node B, the other pointing direction for the UL will be determined by computing the ratio of the desired UL signal to the combined adjacent cell/sector interference at all possible pointing angles. The second UL direction selected is intended to maximize the UL power to the desired Node B while minimizing the interference to adjacent cells based on propagation measurements. In cases where the directions differ, the estimated transmit power of the UE will be used to determine the final direction. If the UE transmit power is near maximum for the minimum interference direction, then the final direction will be the maximum receive power direction.

Since all estimates are based on measurements of the forward link P-CCPCH, there is no slot-to-slot dependence for either the maximum received power direction or the minimum interference direction. Therefore, there is only one uplink direction for all uplink time slots.

An example calculation for the interference direction is shown in Table 1.

TABLE 1

| | Reverse Link Path Loss Estimates (dB) | | | | | |
|---|---|---|---|---|---|---|
| UL Antenna Direction | Desired Node B | Adjacent Node B 1 | Adjacent Node B 2 | Adjacent Node B 3 | Total Interference Power (dBm) | SNR |
| Left | 133 | 138 | 140 | 145 | −135.4 | 2.4 |
| Omni | 133 | 135 | 145 | 135 | −131.8 | −1.2 |
| Right | 138 | 140 | 142 | 138 | −134.9 | −3.1 |

In Table 1, even though left and omni provide the same receive power at the Node B, left beam mode would be selected because it provides 3.5 dB less interference power to the Adjacent Node Bs. Left and right beam modes are about the same in interference power, however right would require 5 dB more UL power (and thus more interference power) at the desired Node B, so left is the better choice.

A further level of sophistication would be to monitor the Node B loading during intra frequency search and then weight the UL interference calculations accordingly. For instance, in the above example adjacent Node B 51-2 would see a 5 dB increase in interference if left is selected over omni. If the UE could determine that Node B 51-2 is severely loaded by monitoring P-CCPCH of Node B 51-2, then the UE could potentially select omni instead of left to reduce the interference load at Node B 51-2.

1.2.4 Open Loop Power Control

As also mentioned in connection with FIG. 9, UL open loop power control will be affected by the integration of the directional antenna because open loop power control relies on the accurate calculation of a forward (DL) path loss to estimate the reverse (UL) path loss. This calculation assumes that the antenna gain in both the UL and DL is the same. However, since the UL and DL pointing directions can be different, different gain can be present in the UL and DL. The forward (DL) path loss estimate must be adjusted for gain differences between pointing positions as outlined in Section 1.1.7. The same is true during the calculation of reverse (UL) link power. Gain differences between omni mode and directional modes must be compensated for during calculations of UL power to the desired Node B. This gain difference can be calculated from the data collected during the intra-frequency search.

1.3 Coordination of UL and DL pointing changes

Because the Node B may itself be using a beam former, the UE should change the UL and DL pointing directions at a rate that is slower than that of the beam former at the Node B. It may also be advantageous to have the DL and UL directions change only at certain time intervals. If the Node B is using beam formers, the DL beam is being determined based on UL data. If the LL direction on the ULE is changed, the Node B may adjust its UL beam based on that change and subsequently adjust its DL beam. The SIR numbers computed for the DL by the forward power control in the UE thus may no longer be valid for the new DL beam position. The SIR estimates for DL pointing are valid relative to each other because they were taken from the P-CCPCH in omni. At any time the UL UE pointing direction is adjusted, the forward power control may need some time to adjust if the Node B is using beam formers. The forward power control will also need some time to adjust if the DL UE direction is changed. In order to keep the number of forward power control transients down, it is recommended that the changes in UL and DL directions occur periodically, at the same time, and at a rate slower than both the beam former update and forward power control update.

1.4 Timing Adjustments

Any timing adjustments of slot times based on the path structure at either the UE or Node B receive may be affected by integration of a directional antenna. This is due to the fact that an omni-directional antenna, or the directional antenna in omni mode, will see all incident paths at the UE receiver, but the relatively high front to back ratio of the directional antenna combined with the directional mode (left or right) may result in a subset of the path structure received by the UE. Furthermore, the relative amplitude between the paths may change between the omni mode and a directional mode. If one assumes reciprocity in path structure, then any change in UE pointing direction on the UL will also affect the path structure seen at the Node B receiver.

2. Acquisition

During initial cell site selection, the UE computes RSCP for the P-CCPCH of each detected Node B. With the integration of the directional antenna, the RSCP must be measured at all pointing angles. The preferred procedure is to perform initial detection of cell sites in omni mode, and then further qualify each detected cell site with measurements at all pointing angles. Thus the initial detection is identical to detection with a single omni antenna. However, an additional set of procedures is performed after the initial detection to determine the best pointing angle for each detected cell. In particular, the multi-dwell (i.e., over multiple time slots) searcher used for the omni search is adjusted to achieve the same sensitivity in terms of maximum path loss, as it would have had if the search were conducted in directional mode. The sensitivity improvement is the absolute gain difference between omni and directional mode. This allows for extra gain in directional mode to be used for increased coverage. The final selection for initial acquisition can be made based on the highest RSCP over all angles for all detected cells, the maximum forward SIR over all angles for all detected cells, the maximum estimated reverse SIR, or a combination of the three. SIR can be used to select the forward link direction and received power was used to determine the initial reverse link pointing direction (reciprocity is assumed), for an FDD system. This is a compromise direction, which is selected based on the forward and reverse link directions.

For a TDD implementation, the forward SIR of interest is that which is maintained by the forward power control for an allocated slot time. Since this is not known prior to CELL_FACH, the SIR calculated by the searcher would be a value based on P-CCPCH SIR measurements of individual Node B's or a ratio of RSCP measurements between Node B's. Use of the cell with the highest RSCP would minimize the path loss between the UE and the Node B, this may be desirable under conditions when the downlink is marginal and the uplink would be near maximum output power (same DL/UL direction). Under normal conditions choosing the cell with the highest ratio of RSCP to the other cells would most likely give the best performance when both uplink and downlink are considered together (same DL/UL direction). Since the ratio of RSCP is the same criteria used to steer the UL during steady state, using this direction for initial connection with the Node B allows a potential UL beam former to maintain the same direction during call setup, and minimizes the impact to adjacent cells.

The TDD initial cell acquisition procedure can thus be as follows:

a. Select omni mode; acquire cells as in prior art implementations (detected set).
b. For each additional direction (left and right for a three mode antenna), compute the RSCP for each detected cell.
c. For each direction setting (omni, left, right) compute the ratio between the cell with the largest RSCP and sum of the RSCP for the other detected cells.
d. Select the cell/direction with the largest ratio (active set).

3. Handover

Ideally, cell reselection should be based on the same criteria as initial cell acquisitions. Measurement of each detected Node B's P-CCPCH RSCP should be used to calculate the pointing direction for the UL and DL together using the maximum interference ratio. However, since handover is based on measurements of RSCP reported to the Node B by the UE, the Node B has ultimate control over cell reselection. Without modification of the measurement reporting scheme and potentially the cell reselection algorithms at the base station, there are two options.

The first option is to collect the RSCP on the P-CCPCH of the monitored set at all possible pointing directions. The RSCP that gets reported or used for any configured measurement is the RSCP for the monitored set member at its best pointing direction. The UE maintains the history of the pointing directions associated with each set member, and if the base station commands a handover to a new cell, the UE uses the direction associated with the new active set member. This allows the base station algorithms to remain unaffected and oblivious to the UE antenna. However, from an interference mitigation standpoint, the cell selected based on the highest RSCP may not be the best from an interference standpoint.

The second option is to collect the RSCP on the P-CCPCH of the monitored set, and compute the best cell based on the maximum signal to interference ratio. When the best cell/direction based on interference differs from the best cell/direction based on highest RSCP, then the RSCP measurements reported to the Node B are biased by an amount to cause the Node B to allow handover to the best cell from an interference standpoint. This would only be done under conditions when the UE had excess transmit power to deal with any loss in receive power at the base station by making such a selection.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for setting a direction for an antenna in a wireless communication system having both uplink and downlink communication channels, the method comprising the steps of:
    setting the antenna to a candidate setting;
    measuring a metric associated with utilization of the antenna at the candidate setting;
    determining an optimum setting based upon such metrics measured for at least two candidate settings; and
    using different metrics for determining the optimum setting for the uplink and downlink communication channels.

2. A method as in claim 1 wherein different optimum settings are determined for the uplink and downlink channels.

3. A method as in claim 1 wherein the candidate settings include an omnidirectional setting.

4. A method as in claim 1 wherein an optimum setting for the antenna in an uplink channel is determined from a metric measured from a signal received on a downlink channel.

5. A method as in claim 1 wherein multiple metric measurements are averaged before determining the optimum setting.

6. A method as in claim 1 wherein the metric is taken from a received pilot channel signal.

7. A method as in claim 1 wherein the metric is taken from a received data payload signal.

8. A method as in claim 1 wherein the system is a Time Division Duplex (TDD) system, and the uplink and downlink channels are time slotted.

9. A method as in claim 8 wherein the metric is taken during inactive time slots.

10. A method as in claim 8 wherein active time slots are scheduled in advance.

11. A method as in claim 10 wherein active time slots are scheduled by a central base station.

12. A method as in claim 8 wherein metrics for the antenna candidate settings are measured during unused time slots.

13. A method as in claim 8 additionally comprising the step of: storing optimum positions determined for different time slots as needed, in synchronization with active time slot assignments.

14. A method as in claim 13 additionally comprising the step of: reading at the stored optimum settings.

15. A method for dynamically determining a steering direction of an antenna in a wireless system comprising:
    providing a transmission quality metric applicable to describe a quality measure of a wireless signal;
    applying the quality metric to a current steering position of the antenna;
    repointing the antenna to a trial steering position;
    reapplying the quality metric to the trial steering position;
    comparing the quality metrics of the current and trial steering positions;
    repeating the repointing by incrementally selecting a new trial steering position;
    selecting a best steering position by comparing each of the incremented trial steering positions;
    determining an active time slot sequence, the active time slots employed for transmission of data;
    identifying a frame offset in the sequence of the active time slots;
    determining non-occupied time slots in the sequence based on a frame offset; and
    transmitting information in directional non-active time slots.

16. A method as in claim 15 wherein the directional information is indicative of a plurality of the candidate settings.

17. A method as in claim 16 further comprising the step of:
    computing an optimum setting from the directional information transmitted for a plurality of candidate directions.

18. A method for setting a direction for an antenna in a wireless communication system having both uplink and downlink communication channels, the system being a Time Division Duplex (TDD) system, and the uplink and downlink channels are time slotted, the method comprising the steps of:
    setting the antenna to a candidate setting;
    measuring a metric associated with utilization of the antenna at the candidate setting;
    determining an optimum setting based upon such metrics measured for at least two candidate settings;
    using different metrics for determining the optimum setting for the uplink and downlink communication channels;
    determining an active time slot sequence, the active time slots employed for transmission of data;
    identifying a frame offset in the sequence of the active time slots;
    determining non-occupied time slots in the sequence based on a frame offset; and
    transmitting information in directional non-active time slots.

* * * * *

UNITED STATES PATENT AND TRADEMARK OFFICE
CERTIFICATE OF CORRECTION

PATENT NO. : 7,308,285 B2
APPLICATION NO. : 10/434437
DATED : December 11, 2007
INVENTOR(S) : Nelson, Jr. et al.

It is certified that error appears in the above-identified patent and that said Letters Patent is hereby corrected as shown below:

IN THE SPECIFICATION

At column 4, line 11, after the word "position", insert --and--.

At column 5, line 48, after the word "similar", delete "a".

At column 6, line 27, after the words "also be", delete "feed" and insert therefor --fed--.

At column 6, line 52, before "of 3.84", delete "(tc)" and insert therefor --$(t_c)$--.

At column 7, line 63, before the word "active", delete "for" and insert therefor --from--.

At column 8, line 54, after the word "below", insert --in--.

At column 9, line 36, after the words "sophisticated", delete "ACSP" and insert therefor --ASCP--.

At column 9, line 39, after the words "time, the" delete "ACSP" and insert therefor --ASCP--.

At column 9, line 42, after the word "sophisticated", delete "ACSP" and insert therefor --ASCP--.

At column 9, line 46, after the words "of the", delete "ACSP" and insert therefor --ASCP--.

At column 9, line 62, before the word "logic", delete "ACSP" and insert therefor --ASCP--.

At column 9, line 66, after the words "simplifying the", delete "ACSP" and insert therefor --ASCP--.

At column 14, line 56, after the word "directional", delete "antennabecause" and insert therefor --antenna because--.

UNITED STATES PATENT AND TRADEMARK OFFICE
CERTIFICATE OF CORRECTION

PATENT NO. : 7,308,285 B2
APPLICATION NO. : 10/434437
DATED : December 11, 2007
INVENTOR(S) : Nelson, Jr. et al.

It is certified that error appears in the above-identified patent and that said Letters Patent is hereby corrected as shown below:

At column 15, line 10, before the words "is changed", delete "LL direction on the ULE" and insert therefor --UL direction on the UE--.

Signed and Sealed this

Fifteenth Day of July, 2008

JON W. DUDAS
*Director of the United States Patent and Trademark Office*